(12) United States Patent
Fabre et al.

(10) Patent No.: US 11,280,273 B2
(45) Date of Patent: Mar. 22, 2022

(54) BELLCRANK FOR A TURBOMACHINE

(71) Applicant: Safran Aircraft Engines, Paris (FR)

(72) Inventors: Adrien Jacques Philippe Fabre, Moissy-Cramayel (FR); David Khalil Charrier, Moissy-Cramayel (FR); Damien Daniel Sylvain Lourit, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 83 days.

(21) Appl. No.: 16/677,461

(22) Filed: Nov. 7, 2019

(65) Prior Publication Data

US 2020/0149478 A1 May 14, 2020

(30) Foreign Application Priority Data

Nov. 8, 2018 (FR) ...................................... 1860324

(51) Int. Cl.
*F02C 7/36* (2006.01)
*F01D 17/12* (2006.01)
*F04D 29/56* (2006.01)

(52) U.S. Cl.
CPC ................ *F02C 7/36* (2013.01); *F01D 17/12* (2013.01); *F04D 29/563* (2013.01); *F05D 2220/30* (2013.01); *F05D 2230/31* (2013.01); *F05D 2240/12* (2013.01); *F05D 2260/50* (2013.01)

(58) Field of Classification Search
CPC .......... F01D 17/12; F01D 17/14; F01D 17/16; F01D 17/162; F01D 17/165; F01D 9/02; F04D 29/563; F04D 27/0246; F04D 29/462; F05D 2260/50; F05D 2230/31; F05D 2220/30; F05D 2240/12; F05D 2270/56; F02C 9/22; F02C 9/26; F02C 7/32; F02C 7/36
See application file for complete search history.

(56) References Cited

U.S. PATENT DOCUMENTS

| 3,640,469 | A | * | 2/1972 | Hayes | ................... | B64C 29/005 |
| | | | | | | 239/265.35 |
| 6,076,423 | A | * | 6/2000 | Honda | ................... | F01D 17/105 |
| | | | | | | 74/519 |
| 2019/0024694 | A1 | * | 1/2019 | Chuckta | ................... | F01D 17/16 |

FOREIGN PATENT DOCUMENTS

FR          2936565 A1    4/2010

OTHER PUBLICATIONS

3D Printing Media Network, "Aircraft, Spacecraft and Drones Reports: The Future of industrial Additive Production Takes Off", Sep. 15, 2017,11 pages.
Leap, "Topological Optimisation with ANSYS 17.0", Leading Engineering Application Providers, Australia and New Zealand, Finite Element Analysis FEA Blog, Retrieved on Jul. 15, 2019,11 pages.

* cited by examiner

*Primary Examiner* — J. Todd Newton
*Assistant Examiner* — Jesse M Prager
(74) *Attorney, Agent, or Firm* — Womble Bond Dickinson (US) LLP

(57) ABSTRACT

The invention relates to a bellcrank for a turbomachine having a first bore, a second bore and a third bore, the first bore being connected to the second bore by a first branch, the second bore being connected to the third bore by a second branch, the third bore being connected to the first bore by a third branch, a fourth branch connecting the first branch to the second branch.

12 Claims, 2 Drawing Sheets

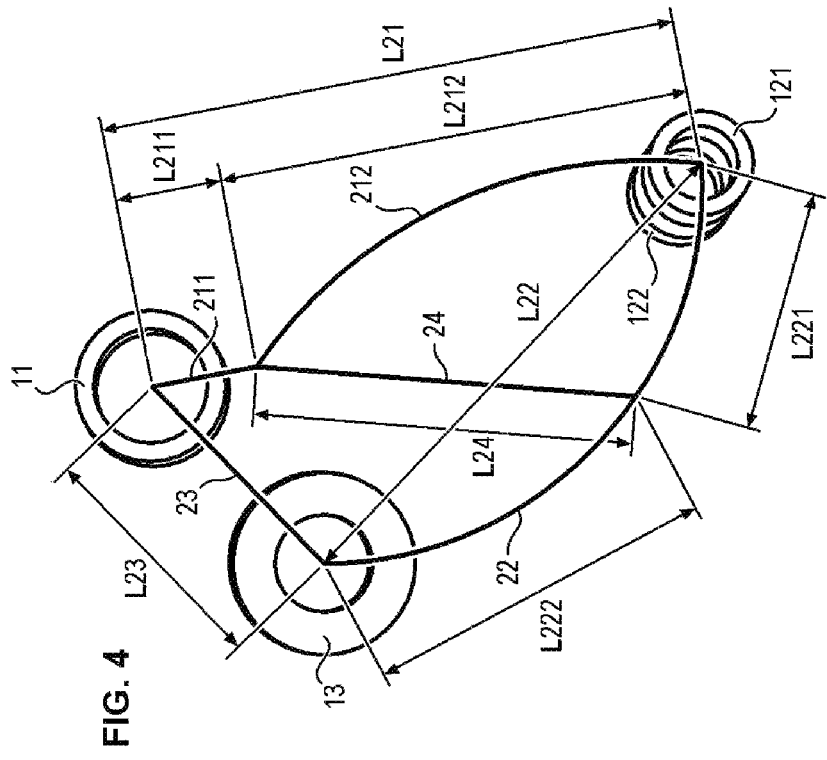

BELLCRANK FOR A TURBOMACHINE

FIELD OF THE INVENTION AND STATE OF THE ART

The present invention relates to a bellcrank for an aeronautical turbomachine.

In the aeronautical field, a bellcrank is an angle lever having three pivot points.

Particularly, one of the three pivot points is a fixed point of rotation of the bellcrank allowing to transmit a force, applied to one of the other two pivot points, to the last pivot point.

In the field of turbomachines, it is known to use a bellcrank 1 to connect, for example, a cylinder rod to a control ring 301, by pivoting on a point of attachment 303 of a casing 310 on the outer side of the flowpath of a compressor of the turbomachine, as represented for example in FIG. 1.

Particular examples of bellcrank mounting for the control of a ring for actuating a variable-pitch stator of a compressor of the turbomachine are disclosed in document FR2936565.

Conventionally, the bellcrank is a part made of titanium obtained by conventional manufacturing means for example by forging then machining. Typically and in the general example of mounting represented in FIG. 1, the bellcrank serves as a connecting rod for transmitting a control force while being connected, on the one hand, to an actuator such as a cylinder and, on the other hand, to the control ring which is rotatable around the casing so as to actuate levers associated with a variable-pitch vane axis in a stator vane assembly of the compressor. Given that the variable-pitch vanes are numerous and undergo aerodynamic stresses affecting their pivot axes, significant forces are likely to be transmitted via the bellcrank. In addition, significant frictions are present and the actuator may be unique for example for a ring. The bellcrank has a substantially L-shaped geometry, as represented for example in FIG. 2.

In such a geometry, the angle of the "L" constitutes the fixed pivot point 313 serving in correspondence of the point of attachment 303, the long end of the "L" has the pivot point 312, here shaped as a clevis 321, connected to the cylinder rod, and the short end of the "L" has the pivot point 311 connected to the control ring 301.

With a view to reducing the consumption of an aeronautical turbomachine, and therefore decreasing the mass of the turbomachine (or even the aircraft to which it is fixed), it seems necessary to reduce the mass of the bellcrank because the density of the titanium makes it a heavy part in relation to its volume.

In order to reduce the mass of the bellcrank, the following paradox arises: it is difficult to change the material because the titanium has mechanical strength properties necessary for this part while having a density nevertheless lower than steel; but the geometry of the bellcrank must enable it to maintain its function of lever with three-pivot points and to withstand the forces applied thereto.

General Presentation of the Invention

In this context, the present invention aims at providing a bellcrank having a geometry adapted to have a function of lever with three-pivot points, while being adapted to mechanical stresses and having a reduced mass.

According to a first aspect, the invention relates to a bellcrank for a turbomachine having a first bore, a second bore and a third bore, the first bore being connected to the second bore by a first branch, the second bore being connected to the third bore by a second branch, the third bore being connected to the first bore by a third branch, a fourth branch connecting the first branch to the second branch.

The presence of four branches—instead of two in the prior art—allows having thinner branches while having a mechanical strength equivalent to or greater than that of the known bellcranks.

Thus, the present invention provides a bellcrank with a geometry adapted to have a function of lever with three-pivot points, while being adapted to mechanical stresses and having a reduced mass.

The first branch may have a first portion extending from the first bore to a point of junction of the first branch with the fourth branch, and a second portion extending from said point of junction of the first branch with the fourth branch to the second bore. the first portion being substantially rectilinear and the second portion being substantially curvilinear.

The second portion of the first branch may be strictly convex or strictly concave.

A length of the first portion of the first branch may be less than three times a length of the second portion of the first branch.

The second branch may have a first portion comprised between the second bore and a point of junction of the fourth branch with the second branch, and a second portion comprised between said junction point and the third bore, a length of said first portion being less than or equal to a length of said second portion.

The second bore may comprise two coaxial rings and the first branch and the second branch each have a forked end region to connect said two rings.

The second branch can be substantially curvilinear.

The second branch can be strictly convex or strictly concave.

The fourth branch can be substantially rectilinear.

The third branch can be substantially rectilinear.

A length of the third branch can be strictly less than: a length of the first branch, a length of the second branch and a length of the fourth branch.

According to one particular disposition, a first web of material can connect the second portion of the first branch, the first portion of the second branch and the fourth branch.

According to another particular disposition, a second web of material can connect the first portion of the first branch, the second portion of the second branch, the third branch and the fourth branch.

According to a second aspect, the invention relates to a turbomachine comprising at least one bellcrank according to the invention.

The turbomachine may comprise a compressor comprising at least one stator vane assembly of variable-pitch vanes, the bellcrank being adapted to the control of a ring for actuating said variable-pitch stator vanes of the compressor.

According to a third aspect, the invention relates to a method for manufacturing a bellcrank according to the invention, implemented by additive manufacturing of said bellcrank.

DESCRIPTION OF THE FIGURES

Other characteristics and advantages of the invention will become more apparent from the following description, which is purely illustrative and non-limiting, and should be read in relation to the appended figures wherein:

FIG. 3 is a perspective representation of a bellcrank according to a possible embodiment of the invention;

FIG. 4 is a schematic representation of the bores and of the outline of the branches according to a possible embodiment of the invention.

DETAILED DESCRIPTION OF THE INVENTION

Bellcrank

Figure 2:
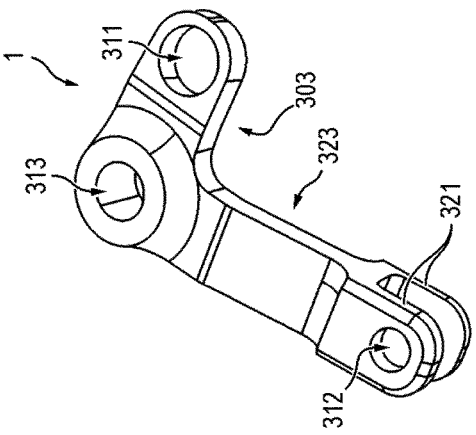
FIG. 2 is a perspective representation of a bellcrank of the prior art.
Figure 1:
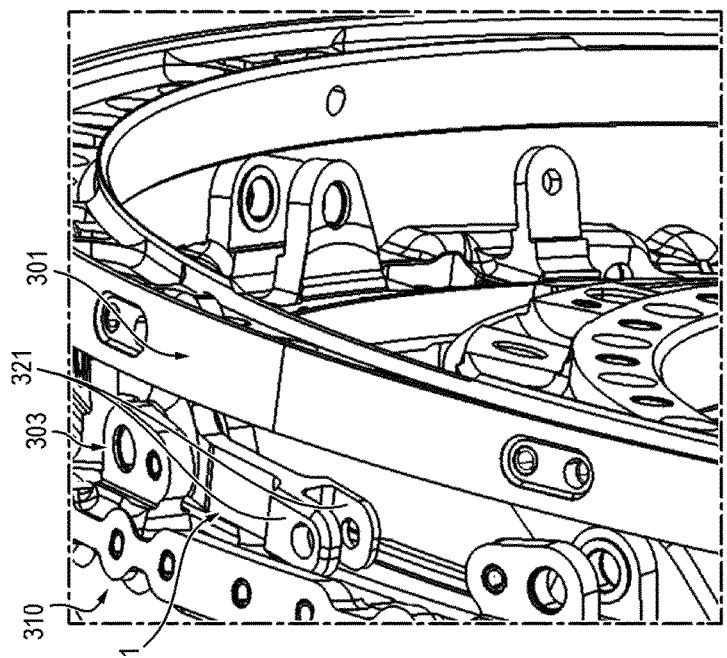
FIG. 1 is a perspective representation of a bellcrank of the prior art fixed to a turbomachine.

With reference to FIG. 3, the invention relates to a bellcrank 1 for a turbomachine.

It will be understood that in the present document "bellcrank" is defined as an angle lever having three pivot points.

Particularly, one of the three pivot points is a fixed point of rotation of the bellcrank allowing to transmit a force applied to one of the other two pivot points at the last pivot point.

The bellcrank 1 has essentially three bores 11, 12, 13 and four branches 21, 22, 23, 24. By "bore" is meant a substantially cylindrical element able to receive a shaft (in an also substantially cylindrical coaxial cavity), i.e. each bore has a ring shape. As will be seen, the second bore 12 is preferably split, that is to say it comprises two coaxial rings 121 and 122. Indeed, it is the bore intended to receive the end of a cylinder, between these two rings 121, 122 that can constitute a pivot clevis.

By "branch" is meant a substantially elongated rigid connection element, i.e. the whole bellcrank constitutes a solid part and the bores 11, 12, 13 are fixed relative to each other through the branches 21, 22, 23, 24.

In a preferred manner, the third bore 13 is "thicker" than the first and second bores 11, 12 (that is to say its ring has a wall with a thickness greater than that of the rings of the other bores) because it is the bore which is intended to serve as a point of rotation of the operating bellcrank, and therefore to undergo the strongest stresses.

A first bore 11 is connected to the second bore 12 by a first branch 21.

The second bore 12 is connected to a third bore 13 by a second branch 22.

The third bore 13 is connected to the first bore 11 by a third branch 23.

A fourth branch 24 connects the first branch 21 to the second branch 22.

Thus, schematically the bellcrank 1 has a triangular architecture with the fourth branch 24 passing through the triangle to connect the first branch 21 and the second branch 22. There is therefore a first point of junction 210 of the first branch 21 with the fourth branch 24 and a second point of junction 220 of the second branch 22 with the fourth branch 24.

According to the embodiment presented here, the branches 21, 22, 23 and 24 are substantially cylindrical rods, but it will be understood that they may be of any section, and in particular parallelepiped section.

In a particularly advantageous manner, the first branch 21 has two portions 211 and 212, which can be described as segments. A first portion 211 extends from the first bore 11 to the point of junction 210 of the first branch 21 with the fourth branch 24. A second portion 212 extends from said point of junction 210 of the first branch 21 with the fourth branch 24 to second bore 12.

In a similar manner, the second branch 22 has a first portion 221 comprised between the second bore 12 and the point of junction 220 of the fourth branch 24 with the second branch, and a second portion 222 comprised between said junction point 220 and the second branch 221 and third bore 13. These two portions 221 and 222 can be called segments.

Preferably, the first portion 211 is substantially rectilinear and the second portion 212 is substantially curvilinear.

According to the embodiment presented in FIG. 3, the second portion 212 is strictly convex, however, according to another embodiment, it could be strictly concave.

The second branch 22 is substantially curvilinear. According to the embodiment presented in FIG. 3, the second branch 22 is strictly convex. However, according to another embodiment, the second branch 22 could be strictly concave. Preferably, the curvatures of the first and second portions 221, 222 of the second branch 22 match.

Preferably, the third branch 23 is substantially rectilinear.

Likewise, the fourth branch 24 is preferably substantially rectilinear.

According to a particularly advantageous disposition, a length $L_{211}$ of the first portion of the first branch 21 is less than three or four times a length $L_{212}$ of the second part 212 of the first branch 21. The length being here defined as the curvilinear longitudinal side of each portion or each branch.

In addition, a length $L_{221}$ of the first portion 220 of the second branch 22 may be less than or equal to a length $L_{222}$ of the second portion 222.

Moreover, a length $L_{23}$ of the third branch is strictly less than: a length $L_{21}$ of the first branch 21, a length $L_{22}$ of the second branch and a length $L_{24}$ of the fourth branch. The third branch 23 is therefore the shortest one of the four branches 21, 22, 23 and 24.

Furthermore, according to the embodiment presented here, the second bore 12 comprises as explained two coaxial rings 121 and 122. Consequently, the first branch 21 and the second branch 22 each have a forked end region for connecting said two rings 121 and 122, i.e. the branches 21, 22 terminate as a "Y".

In the figures, the bellcrank is "hollow" that is to say there is a day between the branches 11, 12, 13, but according to two distinct or cumulative embodiments, not represented, a first web of material could connect the second portion 212 of the first branch 21, the first portion 221 of the second branch 22 and the fourth branch 24. In addition, a second web of material could connect the first portion 211 of the first branch 21, the second portion 222 of the second branch 22, the third branch 23 and the fourth branch 24. By "web" is meant a membrane particularly in a median plane of the bellcrank allowing particularly to further stiffen the whole.

The bellcrank 1 can advantageously be made of titanium, the fineness of the branches allowing a gain in mass, while their positions and their shapes allow optimum mechanical strength, but can also made of other metals, or even of polymer materials depending on the mechanical requirements (weight, stiffness, thermal resistance, friction, etc.).

As will be seen, the present bellcrank is preferably produced by additive manufacturing, but it will be understood that it can be molded or machined.

Turbomachine

The present invention also relates to a turbomachine comprising at least one bellcrank 1. Generally, the bellcrank is in the kinematics for controlling the variable-pitch stator vanes of a compressor for example high-pressure compressor. It is an intermediate part between the actuation cylinder and the ring for controlling the vane assembly of said stator vanes.

Manufacturing Method

The invention also relates to a method for manufacturing the bellcrank by additive manufacturing. Thus, the bellcrank 1 can be made of titanium powder melted layer by layer.

Typically, a digital model of the bellcrank 1 can be made to serve as a basis for an additive manufacturing program by a numerically-controlled additive manufacturing machine.

The numerical model of the bellcrank 1 can be decomposed into a plurality of successive planes that correspond to the layers of material that will be implemented.

Then, the machine spreads a layer of metal powder on a working surface, then a laser diode, or an electrode, melts the powder, point by point according to each plane.

The unmelted powder is discharged, then powder is again disposed on the working surface and on the already melted structure.

These powder spreading and melting steps are repeated so that the bellcrank 1 is manufactured layer by layer.

In a particularly advantageous manner, the additive manufacturing allows directly obtaining a finished part (i.e. it is not necessary to have a finishing step, as may be the case in foundries) which has mechanical characteristics at least equivalent to those of an identical part made in foundries.

Thus, additive manufacturing allows significant time savings.

The invention claimed is:

1. A bellcrank for a turbomachine wherein said bellcrank has a first bore, a second bore and a third bore, the first bore being connected to the second bore by a first branch, the second bore being connected to the third bore by a second branch, the third bore being connected to the first bore by a third branch, a fourth branch connecting the first branch to the second branch, the second bore comprising two coaxial rings and the first branch and the second branch each having a forked end region to connect said two rings,
    wherein the first branch has a first portion extending from the first bore to a point of junction of the first branch with the fourth branch, and a second portion extending from said point of junction of the first branch with the fourth branch to the second bore, the first portion being rectilinear and the second portion being curvilinear,
    wherein a first web of material connects the second portion of the first branch, the first portion of the second branch and the fourth branch, and/or a second web of material connects the first portion of the first branch, a second portion of the second branch, the third branch and the fourth branch; and
    wherein the second branch has a first portion comprised between the second bore and a point of junction of the fourth branch with the second branch, and a second portion comprised between said junction point and the third bore, a length of said first portion being less than or equal to a length of said second portion.

2. The bellcrank according to claim 1, wherein the second portion of the first branch is strictly convex or strictly concave.

3. The bellcrank according to claim 1, wherein a length of the first portion of the first branch is less than three times the length of the second portion of the first branch.

4. The bellcrank according to claim 1, wherein the second branch has a first portion comprised between the second bore and a point of junction of the fourth branch with the second branch, and a second portion comprised between said junction point and the third bore, a length of said first portion being less than or equal to a length of said second portion.

5. The bellcrank according to claim 1, wherein the second branch is curvilinear.

6. The bellcrank according to claim 5, wherein the second branch is strictly convex or strictly concave.

7. The bellcrank according to claim 1, wherein the fourth branch is rectilinear.

8. The bellcrank according to claim 1, wherein the third branch is rectilinear.

9. A bellcrank for a turbomachine wherein said bellcrank has a first bore, a second bore and a third bore, the first bore being connected to the second bore by a first branch, the second bore being connected to the third bore by a second branch, the third bore being connected to the first bore by a third branch, a fourth branch connecting the first branch to the second branch, the second bore comprising two coaxial rings and the first branch and the second branch each having a forked end region to connect said two rings, wherein a length of the third branch is strictly less than: a length of the first branch, a length of the second branch and a length of the fourth branch.

10. A turbomachine comprising at least one bellcrank according to claim 1.

11. The turbomachine according to claim 10, comprising a compressor comprising at least one stator vane assembly of variable-pitch vanes, the bellcrank being adapted to the control of a ring for actuating said variable-pitch stator vanes of the compressor.

12. A method for manufacturing a bellcrank according to claim 1, wherein said method is implemented by additive manufacturing of said bellcrank.

* * * * *